Sept. 23, 1958  E. KARIG  2,852,953
AUTOMATICALLY VARIABLE TRANSMISSION
Filed Feb. 14, 1956  5 Sheets-Sheet 1

INVENTOR.
Erhardt Karig
BY Michael S. Striker
Attorney

Sept. 23, 1958     E. KARIG     2,852,953

AUTOMATICALLY VARIABLE TRANSMISSION

Filed Feb. 14, 1956     5 Sheets-Sheet 2

INVENTOR.
Erhardt Karig
BY Michael S. Striker
agt.

Sept. 23, 1958     E. KARIG     2,852,953
AUTOMATICALLY VARIABLE TRANSMISSION
Filed Feb. 14, 1956     5 Sheets-Sheet 3
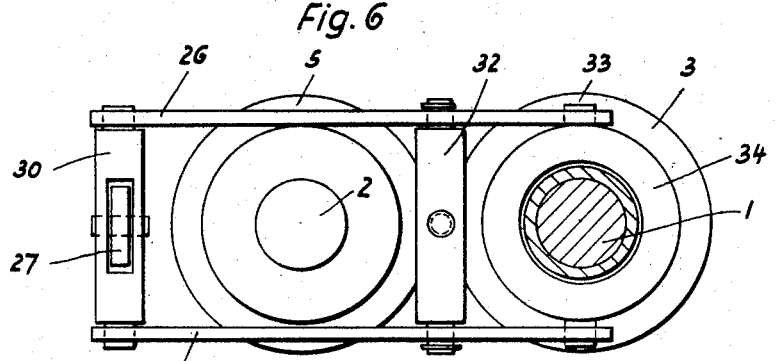
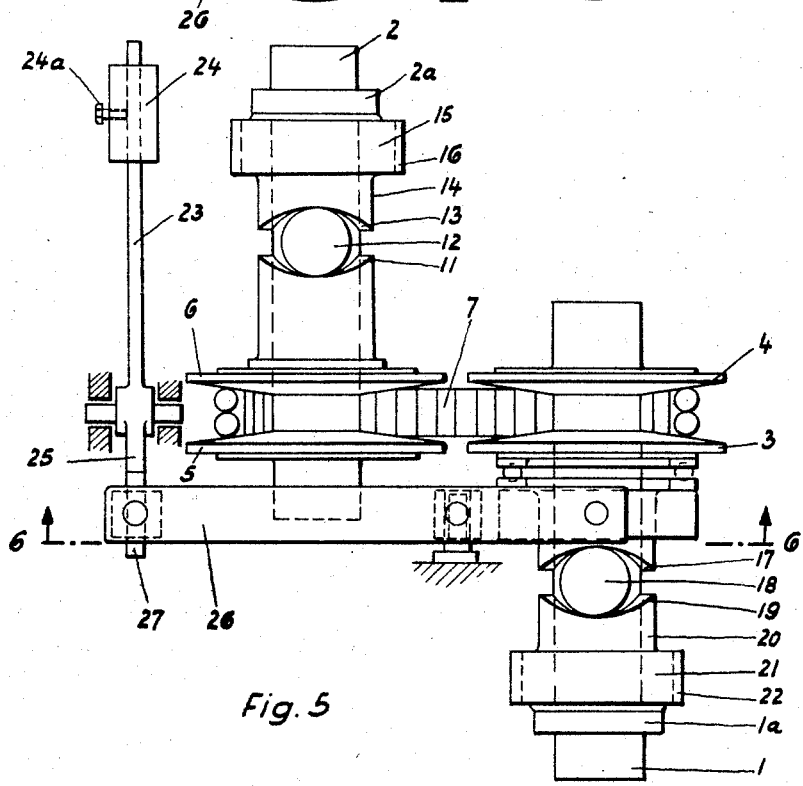
INVENTOR:
Erhardt Karig
BY:
Michael S. Striker
agt.

Sept. 23, 1958  E. KARIG  2,852,953
AUTOMATICALLY VARIABLE TRANSMISSION
Filed Feb. 14, 1956  5 Sheets-Sheet 4
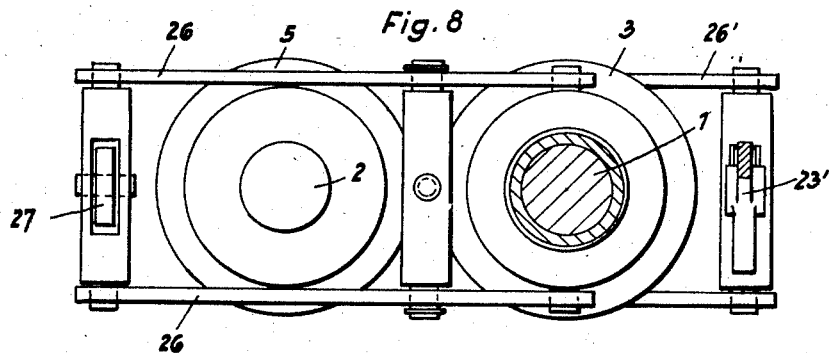
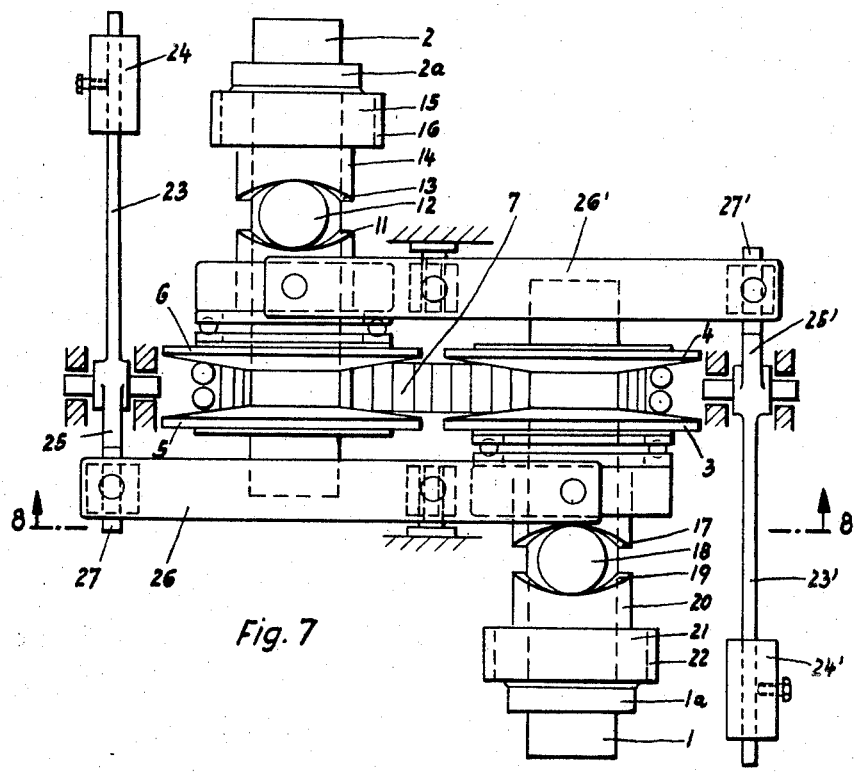
INVENTOR:
Erhardt Karig
BY: Michael S. Striker
agt Sept. 23, 1958 E. KARIG 2,852,953
AUTOMATICALLY VARIABLE TRANSMISSION
Filed Feb. 14, 1956 5 Sheets-Sheet 5

INVENTOR.
Erhardt Karig
BY:
Michael S. Striker
agt

United States Patent Office 2,852,953
Patented Sept. 23, 1958

2,852,953
AUTOMATICALLY VARIABLE TRANSMISSION

Erhardt Karig, Bad Homburg vor der Hohe, Germany, assignor, by mesne assignments, to Reimers Getriebe K. G., Zurich, Switzerland Application February 14, 1956, Serial No. 565,490

Claims priority, application Germany May 27, 1949

14 Claims. (Cl. 74—230.17)

The present invention relates to an automatically variable transmission, and more particularly to a variable speed transmission of the type in which two pairs of cone pulley sections are connected by belt means.

The present application is a continuation-in-part of my copending application Serial No. 163,137, filed May 20, 1950 and now abandoned.

It is one object of the present invention to provide an automatically variable transmission which is particularly suited for winding devices.

It is another object of the present invention to provide an automatically controlled variable transmission for regulating the rotary speed of a driven shaft in a reciprocal ratio with respect to the torque acting on the driven shaft.

It is another object of the present invention to automatically control a variable transmission by means which are independent of the load.

It is another object of the present invention to provide an automatically controlled variable transmission for a winding device for winding and unwinding a web or wire at constant tension.

It is another object of the present invention to provide in a variable transmission, two regulating means acting independently of the load, such regulating means being selectively rendered operative and inoperative, respectively, in accordance with the direction in which the web runs.

It is another object of the present invention to provide a variable transmission which is controlled by weight actuated regulating means which act independently of load torque.

It is another object of the present invention to provide in a variable transmission including cone pulley sections and belt means, regulating means which press the cone pulley sections against the belt means at a force which varies according to a selected function with the distance between the cone pulley sections.

It is another object of the present invention to provide in a variable transmission, means for preselecting the force which is automatically varied during the operation of the transmission in accordance with the distance between the pulley sections.

With these objects in view, the present invention mainly consists in a variable transmission which comprises, in combination, drive pulley means; driven pulley means, each of the pulley means including a pair of oppositely arranged cone pulley sections, one cone pulley section of each of the pulley means being movable in axial direction relative to the other cone pulley section of the respective pulley means; belt means connecting the drive pulley means with the driven pulley means and running between the cone pulley sections of each of the pairs of pulley sections; torque transmitting output means operatively connected to the movable pulley section of the driven pulley means for urging the same against the belt means and toward the other pulley section of the driven pulley means with a force depending on the load torque transmitted by the torque transmitting output means; and regulating means engaging the movable pulley section of the drive pulley means and urging the same against the belt means and toward the other pulley section of the drive pulley means for producing pressure on the belt means independently of the load.

The regulating means preferably include a turnable cam, and weight means for turning the cam in one direction.

According to a preferred embodiment of the present invention, the two pulley means are connected by torque transmitting means to a dynamo-electric machine and to a winding means, respectively. During a winding operation the dynamo-electric machine acts as a motor and drives the transmission and the winding device in such manner that the tension of a web or wire wound by the winding device is constant. When the operation is reversed during an unwinding operation, the dynamo-electric machine acts as a brake generator. In this arrangement, it is preferred to provide two regulating means which are respectively associated with the two torque transmitting means and the two pulley means, and to render one of the two regulating means inoperative. Consequently only the other of the regulating means produces pressure on the belt means which is independent of the load.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 5 is a plan view of a modified embodiment of the present invention;

Fig. 6 is a sectional view taken on line 6—6 in Fig. 5;

Fig. 7 is a plan view of a further modified embodiment of the present invention;

Fig. 8 is a sectional view taken on line 8—8 in Fig. 7; and

Figure 1:
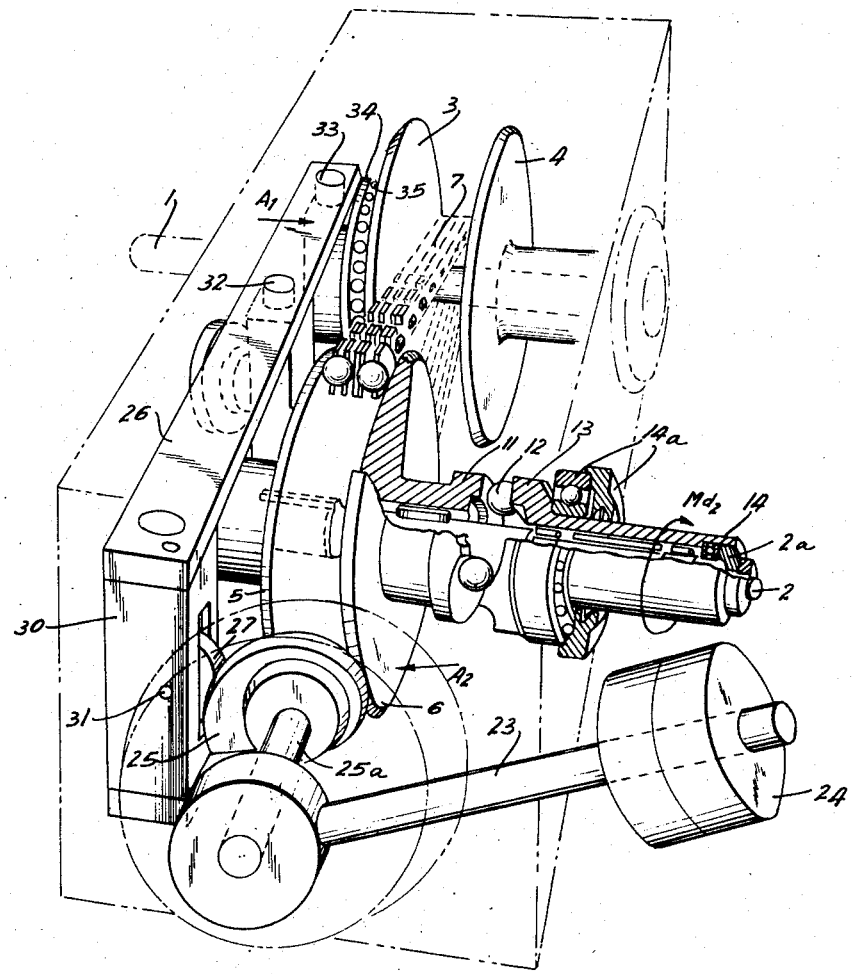
Fig. 1 is an isometric view of one embodiment of the present invention.

Referring now to the drawings, and more particularly to Fig. 1, two pulley means 3, 4 and 5, 6, respectively are arranged in a casing shown in broken lines. A belt means, such as an open link chain 7 connects the two pulley means 3, 4 and 5, 6. Each pulley means includes two cone pulley sections. The cone pulley section 4 is fixedly connected to a shaft 1, and the cone pulley section 3 is movable on the shaft 1 in axial direction. The cone pulley section 5 is fixed on a shaft 2, and the cone pulley section 6 is movable in axial direction. Consequently, the ratio of the transmission depends on the distance between the respective cone pulley sections. In the arrangement shown in Fig. 1, the shaft 1 is assumed to be the drive shaft. An output means 14 in the form of a sleeve mounted on shaft 2 is limited in its axial movement to the right in Fig. 1 by a stop means 2a. Bearing means 14a support the output sleeve 14 for rotation. A cam track 13 is fixedly connected to the output means 14, and is located opposite a cam track 11 which is fixed to the movable pulley section 6. Rolling balls 12 are arranged between the cam tracks 11 and 13. Consequently, the output torque acting on the output sleeve 14, will exert a force on the movable pulley section 6 urging the pulley section 6 toward the pulley section 5 and thereby exerting on the belt means 7 a pressure proportional to the output torque. The output torque is indicated by a curved arrow $Md2$, and the pressure force is indicated by an arrow $A2$. As the force $A2$ increases, the belt means 7 will be urged into a position in which the effective radius of the cone pulley sections 5 and 6 is increased whereby the ratio of transmission is varied in accordance with the output torque.

The axial position of the cone pulley section 3 is controlled independently of the output load. A pivoted lever 26 carries at one end thereof an annular member 34 which is pivotally mounted on the lever 26 by means of pivot pins 33. A ball bearing 35 is arranged between the annular member 34 and the cone pulley section 3. The lever 26 is supported for pivotal movement about a pivot means 32, and at the other end of lever 26, a cam follower roller 27 is mounted on pins 31 in a transverse connecting member 30 which connects the two bars of lever 26. The cam follower roller 27 cooperates with a cam 25 which is mounted on a shaft $25a$. A lever means 23 is connected to shaft $25a$ and turns with the same and with cam 25. A weight means 24 is mounted on lever means 23, and is movable along the lever means 23. The weight 24 turns the shaft $25a$ and the cam 25 in clockwise direction as viewed in Fig. 1, and consequently urges the lever 26 into a position in which the cone pulley section 3 is urged toward the fixed cone pulley section 4. The force at which the cone pulley section 3 is urged against the belt means 7 is indicated by the arrow $A1$.

The forces $A1$ and $A2$ are in a predetermined ratio, so that a variation of one of the two forces necessarily produces a variation of the other of the two forces. At the same time, the effective radii of the pulley means are simultaneously changed, whereby also the transmission ratio is varied. In the arrangement illustrated in Fig. 1, the output torque $Md2$ is to be regulated, if the output torque increases, for instance due to an increased diameter of a wound reel on a winding device connected to the output means 14, the force $A2$ is also increased. Consequently the pulley section 6 moves toward the pulley section 5, increasing the effective radius of the pulley means 5, 6 whereby the effective radius of the pulley sections 3, 4 is decreased. Such decrease of the effective radius of the pulley means 3, 4 results in a movement of the pulley section 3 to the left in Fig. 1 whereby the lever 26 is pivoted in counter-clockwise direction. Such pivoting of the lever 26 results in a greater pressure of the cam follower 27 on the cam 25. The cam 25 is turned against the action of the weight 24, and consequently the pressure of the cam 25 on the cam follower 27 and on the lever 26 is increased which results in an increased pressure of the annular member 34 against the movable cone pulley section 3 whereby the effective radius of the pulley means 3, 4 is again increased. A position of equilibrium is reached in which the forces $A1$ and $A2$ balance each other, and the output means 14 rotate at the desired speed. The cam 25 has such a shape that the adjustment of the rotary speed of the output means compensates the preceding torque variation with respect to the total output.

Figure 2:
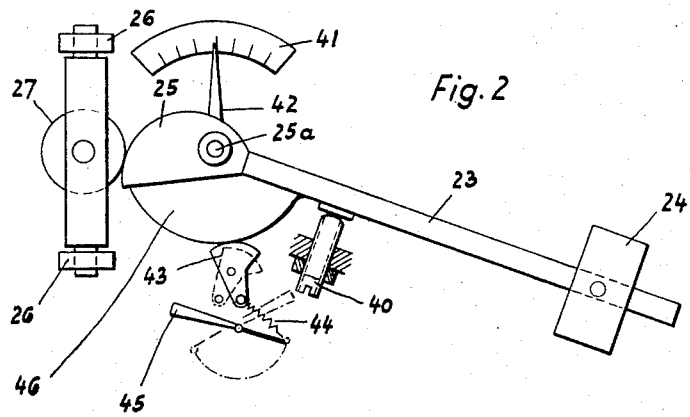
Fig. 2 is a side view of a stop means and arresting device for the regulating means shown in Fig. 1.

The illustration of Fig. 1 is somewhat schematical, and particularly the shape of the lever means 26 is better shown in Fig. 6. The regulating means are shown in greater detail in Fig. 2. As shown in Figs. 1 and 2, the cam 25 cooperates with the cam follower roller 27 on lever 26, and is urged to turn in clockwise direction by the lever 23 and the weight 24 which is movable along lever 23 for adjusting the torque exerted by the weight 24 on the cam 25. Cam 25 produces a force acting on the cam follower 27 so that the lever means 26 is actuated to adjust the output shaft to rotate at increased speed. In order to prevent unduly high speed of the transmission, an adjustable stop means 40 is provided which engages the lever 23 in a selected position. Thereby, a turning of cam 25 beyond the selected position is impossible.

A scale 41, and a pointer 42 connected to cam 25 are provided for indicating the positions of the cam 25 during the operation. As previously explained, the increasing diameter of the wound reel produces an increased output moment, and a decreased speed of rotation which results in a continuous raising of the weight 24. The position of the cam 25 is consequently also a measure for the diameter of the wound reel, and the dial 41 is preferably provided with a corresponding scale. After termination of a winding operation, the weight 24 turns the lever 23 and the cam 25 into a lowermost position defined by the stop means 40.

Fig. 2 also illustrates an arrangement for arresting the cam 25 in any desired position. A manually operated lever 45 is connected by a spring 44 to an arresting member 43 which cooperates with the curved edge of a member 46. When the arresting member is turned into the position shown in broken lines, the member 46 is released, while in the position shown in solid lines, the cam 25 is blocked in clockwise direction of rotation, but is free to turn in counter clockwise direction.

Figure 3:
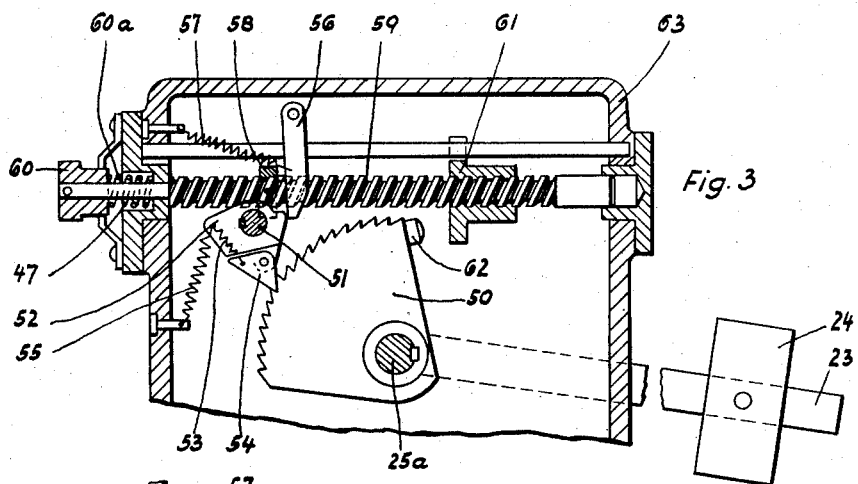
Figs. 3 and 4 are fragmentary sectional views illustrating another arresting device for arresting and stopping the regulating means according to the present invention.
Figure 4:
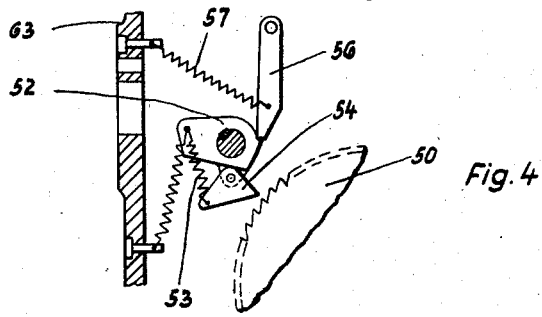

Figs. 3 and 4 illustrate another device which is preferably connected to the shaft $25a$ of the cam 25. A ratchet wheel means 50 is secured to shaft $25a$ for rotation therewith. A shaft 51 supports a ratchet member 52 which is connected by a spring 53 to a ratchet pawl 54 which cooperates with the teeth of the ratchet wheel means 50. A spring 55 urges the ratchet member 52 to turn in counter-clockwise direction. A catch 56 cooperates with the ratchet member 52 and arrests the same in the position shown in Fig. 4 when the ratchet member 52 is turned into the position shown in Fig. 4. A spring 57 is connected to the catch 56 and urges the same into engagement with the ratchet member 52. A threaded spindle 59 can be turned by operation of the knob for moving the stop 61. Stop 61 defines the lowermost position of the weight 24 by engaging a pin 62 on the ratchet wheel means 50. The spindle 59 is mounted in the housing 63 for axial movement, and carries an annular stop member 58 which cooperates with the catch 56. When the button 60 is pushed in against the action of spring $60a$, the catch 56 is released and the spring 55 turns the ratchet member 52 in counter-clockwise direction while the spring 53 turns the ratchet pawl 54 from the position shown in Fig. 4 to the position shown in Fig. 3 in which the ratchet pawl 54 projects into a recess between the ratchet teeth of the ratchet wheel 50 and blocks rotation of the ratchet wheel 50 in clockwise direction, permitting however free turning of the ratchet wheel 50 and the cam shaft $25a$ with cam 25 in counter clockwise direction. When the shaft 51 is turned in clockwise direction from the position shown in Fig. 3 to the position shown in Fig. 4, the ratchet pawl 54 pivots relative to the ratchet member 52 and when the ratchet member has reached the position shown in Fig. 4, the catch 56 engages it and prevents return of ratchet member 52 in counterclockwise direction under the action of spring 55. The ratchet pawl 54 is in the position shown in Fig. 4 permitting turning of the ratchet wheel 50 and cam 25 in both directions. When the catch 56 is released, the ratchet pawl 54 engages the ratchet wheel means 50. The arrangement shown in Figs. 3 and 4 permits turning of the cam 25 into an inoperative position spaced from the cam follower 27, and the regulating means may be arrested in such inoperative position. The arrangements shown in Figs. 3 and 4 also prevent an excessive increase of the rotary speed of the winding device in the event that the wound web, or the wire wound by the output means breaks. In this event, the force A2 becomes zero and the lever 26 would exert no counter pressure against cam 25. The weight 24 tends to turn cam 25 in clockwise direction with the result that the speed of the output means would increase to maximum speed defined by stop means 40 (Fig. 2) or stop means 61 (Fig. 3), respectively. Such a turning movement of cam 25 is prevented by the ratchet means 50 in the position shown in Fig. 3. To release lever 23, cam shaft 25a and cam 25, the shaft 51 has to be turned in clockwise direction so that the ratchet pawl turns into the position of Fig. 4 in which the ratchet wheel 50 can be turned in both directions.

The embodiment illustrated in Figs. 5 and 6 corresponds to a great extent to the embodiment described with reference to Fig. 1. Torque transmitting means are provided on shaft 2, and include an output member 14, and balls arranged between cam tracks 11 and 13. The output member 14 carries a gear 15 having teeth 16 which mesh with a gear connected to a winding device, not shown in Fig. 5. The axially movable pulley section 6 is urged toward pulley section 5 as described with reference to Fig. 1. The regulating means acting on the pulley section 3 comprises an annular member 34, levers 26, a cam follower roller 27, and a weighted lever 23 for turning the cam 25 which cooperates with the cam follower roller 27. In contrast to the arrangement shown in Fig. 1, the drive shaft 1 is not directly connected to the drive pulley means 3, 4. Input torque transmitting means are provided, and include an input member 20 having a cam track 19, and a cam track 17 on the movable pulley section 3. Ball means, or other rolling body means 18 are provided between the cam tracks 17 and 19 for transforming the input torque into an axial movement of the pulley section 3. A gear 21 having gear teeth 22 is secured to the sleeve-shaped input member 20 for connecting the same to drive means. Stop flanges 1a and 2a, respectively, are fixed on shafts 1 and 2, respectively, for limiting axial movement of the members 14 and 20 away from the associated pulley means. The arrangement shown in Figs. 5 and 6 has the advantage that the input torque provides part of the axial force required for shifting the pulley section 3, so that the force which has to be produced by the weight 24 may be reduced. It will be understood that the devices shown in Figs. 2, 3 and 4 are also applied in the arrangement shown in Figs. 5 and 6. Fig. 5 shows an adjusting screw 24a for adjusting the position of the weight 24 on the lever 23.

Figs. 7 and 8 illustrate a modified arrangement according to the present invention. The embodiment corresponds to the embodiment illustrated in Figs. 5 and 6. In addition to the weight operated regulating means which acts on the pulley section 3, another regulating means is provided which acts on the pulley section 6. The second regulating means comprises the same elements as the first regulating means, and the corresponding elements are indicated by the same reference numerals provided with a prime. The weight 24' urges the lever 23' to turn the cam 25', and cam 25' cooperates with the cam follower roller 27' on a lever means 26' which cooperates through an annular member with the movable pulley section 6. In accordance with the present invention, the two regulating means are never simultaneously applied, and one of the two regulating means is placed and held in an inoperative position in which the cam 25, and 25', respectively, is spaced from the corresponding cam follower means 27 and 27', respectively. The arrangement shown in Figs. 3 and 4 is provided in the embodiment of Fig. 7, although it is not shown in Figs. 7 and 8 for the sake of clarity. Consequently, any one of the two levers 23, 23' can be turned into a position in which the cam associated therewith is inoperative, and held in such inoperative position by the means illustrated in Fig. 3. In accordance with the present invention only the movable pulley section of the drive shaft is controlled by the regulating means, and consequently the other regulating means is placed in an inoperative position during operation. However, due to the fact that two regulating means are provided, it is possible to use selectively any one of the two torque transmitting means 14 and 20 as input means or output means, respectively. In any event the regulating means associated with the shaft acting as the drive shaft is operative, and the regulating means associated with the shaft acting as driven shaft is held in an inoperative position by a device according to the devices shown in Figs. 2 and 3. If the device shown in Fig. 2 is used in connection with the regulating means shown in Fig. 7, the lever 23 is manually turned into a position in which the cam 25 is spaced from the cam follower roller 27, and thereupon the lever 23 is arrested in inoperative position by the arresting means 23.

Oil damping means may be provided for damping the movement of the levers 23 and 23'. A piston is connected to lever 23 and moves in an oil filled cylinder whereby the movements of the lever 23 and of the associated cam 25 are slowed down.

Figure 9:
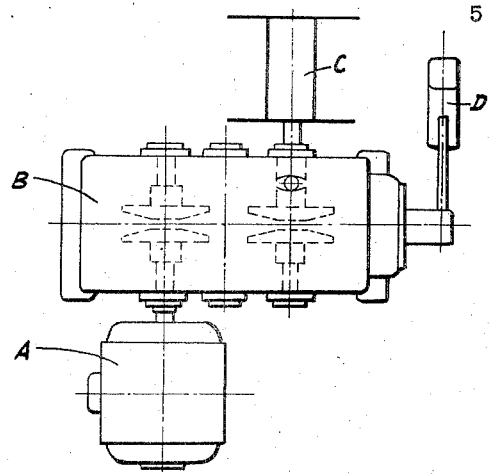
Figs. 9, 10 and 11 are schematic plan views illustrating different operational conditions of an arrangement according to the present invention.

Fig. 9 illustrates an arrangement as described with reference to Fig. 1. A dynamo-electric machine A acting as motor drives the transmission B which has an output means connected to the winding means C. The variable torque of the winding means C is regulated by the regulating means D acting on the drive pulley means.

Figure 10:
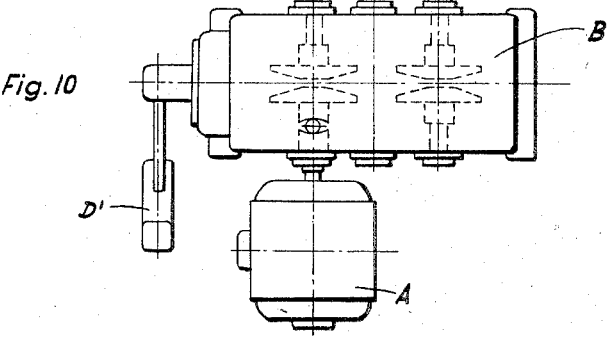

In the arrangement illustrated in Fig. 10, a web is unwound from the winding means C, and consequently the dynamo-electric machine A acts as generator exerting a braking torque. The cam track of the cam 25 used in this arrangement may be suitably designed for this operation.

Figure 11:
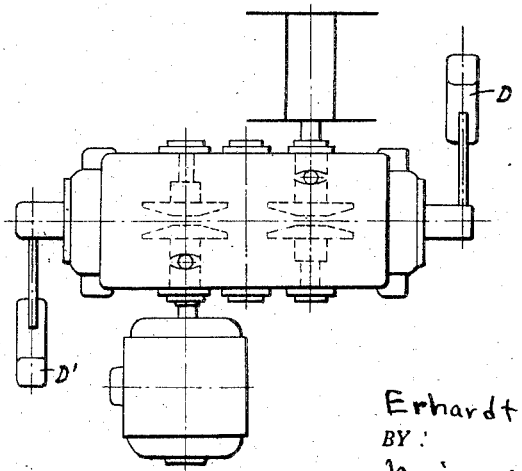

Fig. 11 illustrates an arrangement as described with reference to Fig. 7, and it will be understood that this apparatus can be selectively used for winding and unwinding operations. However, as previously described, one of the regulating means D, D' must be rendered inoperative.

It will be understood that each of the elements described above, or two or more together, may also find a useful application in other types of variable transmissions differing from the types described above.

While the invention has been illustrated and described as embodied in a variable pulley and belt transmission including regulating means which are independent of the load torque, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A variable transmission comprising, in combination, drive pulley means; driven pulley means, each of said pulley means including a pair of oppositely arranged cone pulley sections, one cone pulley section of each of said pulley means being movable in axial direction relative to the other cone pulley section of the respective pulley means; belt means connecting said drive pulley means with said driven pulley means and running between the cone pulley sections of each of said pairs of pulley sections; torque transmitting output means operatively connected to the movable pulley section of said driven pulley means for urging the same against said belt means and toward the other pulley section of said driven pulley means with a force depending on the load torque transmitted by said torque transmitting output means; and regulating means including a cam follower means connected to the movable pulley section of said drive pulley means, a turnable cam engaging said cam follower means, a lever means connected to said cam for turning movement, and adjustable means for urging said lever means to turn in one direction, said adjustable means being adjustable for varying the turning moment acting on said lever means, said adjustable means urging through said lever means said cam to turn in said one direction for pressing said movable pulley section of said drive pulley means against said belt means and toward the other pulley section of said drive pulley means for producing pressure on said belt means independently of the load.

2. A variable transmission comprising, in combination, drive pulley means; driven pulley means, each of said pulley means including a pair of oppositely arranged cone pulley sections, one cone pulley section of each of said pulley means being movable in axial direction relative to the other cone pulley section of the respective pulley means; belt means connecting said drive pulley means with said driven pulley means and running between the cone pulley sections of each of said pairs of pulley sections; torque transmitting output means operatively connected to the movable pulley section of said driven pulley means for urging the same against said belt means and toward the other pulley section of said driven pulley means with a force depending on the load torque transmitted by said torque transmitting output means; and regulating means including a cam follower means connected to the movable pulley section of said drive pulley means, a turnable cam engaging said cam follower means, a lever means connected to said cam for turning movement, and weight means mounted on said lever means for movement along the same for varying the turning moment acting on said lever means, said weight means urging through said lever means said cam to turn in one direction for pressing said movable pulley section of said drive pulley means against said belt means and toward the other pulley section of said drive pulley means for producing pressure on said belt means independently of the load.

3. A variable transmission comprising, in combination, drive pulley means; driven pulley means, each of said pulley means including a pair of oppositely arranged cone pulley sections, one cone pulley section of each of said pulley means being movable in axial direction relative to the other cone pulley section of the respective pulley means; belt means connecting said drive pulley means with said driven pulley means and running between the cone pulley sections of each of said pairs of pulley sections; a rotatable output member movable in axial direction and being coaxial with said driven pulley means and located adjacent said movable pulley section of the same; stop means limiting axial movement of said output member away from said driven pulley means; a pair of opposite cam tracks respectively fixed on said output member and on said movable pulley section of said driven pulley means; rolling body means arranged between said cam tracks and engaging the same so that said movable pulley section of said driven pulley means is urged against said belt means and toward the other pulley section of said driven pulley means with a force depending on the load torque transmitted by said output member; and regulating means engaging the movable pulley section of said drive pulley means and urging the same against said belt means and toward the other pulley section of said drive pulley means for producing pressure on said belt means independently of the load.

4. A variable transmission comprising, in combination, drive pulley means; driven pulley means, each of said pulley means including a pair of oppositely arranged cone pulley sections, one cone pulley section of each of said pulley means being movable in axial direction relative to the other cone pulley section of the respective pulley means; belt means connecting said drive pulley means with said driven pulley means and running between the cone pulley sections of each of said pairs of pulley sections; a rotatable output member movable in axial direction and being coaxial with said driven pulley means and located adjacent said movable pulley section of the same; stop means limiting axial movement of said output member away from said driven pulley means; a pair of opposite cam tracks respectively fixed on said output member and on said movable pulley section of said driven pulley means; rolling body means arranged between said cam tracks and engaging the same so that said movable pulley section of said driven pulley means is urged against said belt means and toward the other pulley section of said driven pulley means with a force depending on the load torque transmitted by said output member; and regulating means including a cam follower means connected to the movable pulley section of said drive pulley means, a turnable cam engaging said cam follower means, and means urging said cam to turn in one direction for pressing said movable pulley section of said drive pulley means against said belt means and toward the other pulley section of said drive pulley means for producing pressure on said belt means independently of the load.

5. A variable transmission comprising, in combination, drive pulley means; driven pulley means, each of said pulley means including a pair of oppositely arranged cone pulley sections, one cone pulley section of each of said pulley means being movable in axial direction relative to the other cone pulley section of the respective pulley means; belt means connecting said drive pulley means with said driven pulley means and running between the cone pulley sections of each of said pairs of pulley sections; a rotatable output member movable in axial direction and being coaxial with said driven pulley means and located adjacent said movable pulley section of the same; stop means limiting axial movement of said output member away from said driven pulley means; a pair of opposite cam tracks respectively fixed on said output member and on said movable pulley section of said driven pulley means; rolling body means arranged between said cam tracks and engaging the same so that said movable pulley section of said driven pulley means is urged against said belt means and toward the other pulley section of said driven pulley means with a force depending on the load torque transmitted by said output member; and regulating means including a cam follower means connected to the movable pulley section of said drive pulley means, a turnable cam engaging said cam follower means, a lever means connected to said cam for turning movement, and weight means mounted on said lever means for movement along the same for varying the turning moment acting on said lever means, said weight means urging through said lever means said cam to turn in one direction for pressing said movable pulley section of said drive pulley means against said belt means and toward the other pulley section of said drive pulley means for producing pressure on said belt means independently of the load.

6. A variable transmission comprising, in combination, drive pulley means; driven pulley means, each of said pulley means including a pair of oppositely arranged cone pulley sections, one pulley section of each of said pulley means being movable in axial direction relative to the other cone pulley section of the respective pulley means; belt means connecting said drive pulley means with said driven pulley means and running between the cone pulley sections of each of said pairs of pulley sections; a rotatable output member movable in axial direction and being coaxial with said driven pulley means and located adjacent said movable pulley section of the same; stop means limiting axial movement of said output member away from said driven pulley means; a pair of opposite cam tracks respectively fixed on said output member and on said movable pulley section of said driven pulley means;

rolling body means arranged between said cam tracks and engaging the same so that said movable pulley section of said driven pulley means is urged against said belt means and toward the other pulley section of said driven pulley means with a force depending on the load torque transmitted by said output member; and regulating means including a pivoted lever engaging at one end thereof the axially movable pulley section of said drive pulley means, a cam follower means mounted on the other end of said pivoted lever, turnable cam engaging said cam follower means, a lever means connected to said cam for turning movement, and weight means mounted on said lever means for movement along the same for varying the turning moment acting on said lever means, said weight means urging through said lever means said cam to turn in one direction for pressing said movable pulley section of said drive pulley means against said belt means and toward the other pulley section of said drive pulley means for producing pressure on said belt means independently of the load.

7. A variable transmission comprising, in combination, drive pulley means; driven pulley means, each of said pulley means including a pair of oppositely arranged cone pulley sections, one cone pulley section of each of said pulley means being movable in axial direction relative to the other cone pulley section of the respective pulley means; belt means connecting said drive pulley means with said driven pulley means and running between the cone pulley sections of each of said pairs of pulley sections; torque transmitting input means operatively connected to the movable pulley sections of the drive pulley means for urging the same against said belt means and toward the other pulley section of said drive pulley means with a force depending on the input torque; torque transmitting output means operatively connected to the movable pulley section of said driven pulley means for urging the same against said belt means and toward the other pulley section of said driven pulley means with a force depending on the load torque transmitted by said torque transmitting output means; and regulating means including a cam follower means connected to the movable pulley section of said drive pulley means, a turnable cam engaging said cam follower means, a lever means connected to said cam for turning movement, and weight means mounted on said lever means for movement along the same for varying the turning moment acting on said lever means, said weight means urging through said lever means said cam to turn in one direction for pressing said movable pulley section of said drive pulley means against said belt means and toward the other pulley section of said drive pulley means for producing pressure on said belt means independently of the load.

8. An infinitely variable speed transmission for winding machines comprising, in combination, a drive shaft; a driven shaft; two oppositely arranged cone pulley sections on each of said shafts, one of each of said oppositely arranged cone pulley sections being fixed to the associated shaft and the other pulley section being axially movable thereon; an open link chain running between each of said oppositely arranged pulley sections; means on both shafts to produce an axial component of the torsional moment for pressing said two movable pulley sections, respectively against said chain and toward the associated fixed pulley sections, said last mentioned means including a cam track on each of said movable pulley sections, rolling body means on each cam track contracting therewith, a rotatable sleeve on each shaft, a flange on each of said shafts for limiting axial movement of the sleeve associated with the respective shaft, another cam track on each of said sleeves engaging the respective rolling body means, and a gear means on each of said sleeves for transmitting its torsional moment; and regulating means acting on one of said movable pulley sections for producing additional pressure independently of the load.

9. An infinitely variable speed transmission for winding machines comprising, in combination, a drive shaft; a driven shaft; two oppositely arranged cone pulley sections on each of said shafts, one of each of said oppositely arranged cone pulley sections being fixed to the associated shaft and the other pulley section being axially movable thereon; an open link chain running between each of said oppositely arranged pulley sections; means on both shafts to produce an axial component of the torsional moment for pressing said two movable pulley sections, respectively against said chain and toward the associated fixed pulley sections, said last mentioned means including a cam track on each of aid movable pulley sections, rolling body means on each cam track contacting therewith, a rotatable sleeve on each shaft, a flange on each of said shafts for limiting axial movement of the sleeve associated with the respective shaft, another cam track on each of said sleeves engaging the respective rolling body means, and a gear means on each of said sleeves for transmitting its torsional moment; and regulating means including a pivoted lever engaging at one end thereof one of said movable pulley sections, a cam follower means mounted on the other end of said pivoted lever, a turnable cam engaging said cam follower means, a lever means connected to said cam for turning movement, and weight means on said lever means urging the same to turn in one direction, said weight means being mounted on said lever means for movement along the same for varying the turning moment acting on said cam, said weight means urging said cam to turn in one direction for pressing said movable pulley section toward the fixed pulley section associated therewith for producing on said chain additional pressure independently of the load.

10. An infinitely variable speed transmission for winding devices and similar machines, comprising, in combination, a driving shaft; a driven shaft; two oppositely arranged cone pulley sections on each shaft, one of each of said oppositely arranged cone pulley sections being fixed to its shaft and the other pulley section being axially displaceable thereon and acting as a driving pulley section; an open link chain running between each of said two oppositely arranged pulley sections; means on both shafts to produce an axial component of the torsional moment for pressing the two driving pulley sections against said chain, said means comprising a cam path on the hub of each of said driving pulley sections, a rolling body on each cam path contacting therewith, a rotatable sleeve on each shaft, a flange on each of said shafts to prevent axial displacement thereof, an additional cam path on each sleeve to support said rolling body and a toothed rim on each sleeve for passing on its torsional moment; and means acting upon the driving pulley section associated with said driving shaft and being disposed on said driving shaft for producing on said last-mentioned driving pulley section additional pressure independently of the load.

11. A variable transmission for a winding machine and comprising, in combination, a pair of shafts; a pulley means mounted on each of said shafts, each of said pulley means including a pair of cone pulley sections, one pulley section of each of said pulley means being fixed and the respective other pulley section being movable in axial direction on the associated shaft; belt means connecting said two pulley means and running between the cone pulley sections of each of said pairs of cone pulley sections; a drive torque transmitting member adapted to be connected to drive means, and an output torque transmitting member adapted to be connected to a winding means, each torque transmitting member being turnably mounted on one of said shafts adjacent the axially movable pulley section of the pulley means mounted on the respective shaft; force transmitting means connecting each of said axially movable pulley sections with the torque transmitting member mounted on the associated shaft for transforming turning movement of said torque transmitting members into axial movement of the respective associated movable pulley section toward the respective associated fixed pulley section; two regulating means, each of said regulating means being associated with one of said pulley means and being movable between a plurality of operative positions and being connected in said operative positions to the movable pulley section of the associated pulley means for gradually urging the same during movement between said operative positions in one direction against said belt means and toward the associated other pulley section for producing pressure independently of the load, each regulating means being movable to an inoperative position disconnected from the associated movable pulley section, each regulating means tending to move in said one direction between said operative positions; and control means for holding in said inoperative position the regulating means associated with the pulley means associated with said output torque transmitting member so that only the other of said regulating means produces pressure on said belt means.

12. A variable transmission as set forth in claim 11 wherein said torque transmitting members are sleeves; wherein said force transmitting means include two pairs of oppositely arranged cam tracks, one cam track of each pair being secured to one of said movable pulley sections and the other cam track of each pair being secured to one of said sleeves, and rolling body means arranged between said cam tracks; and wherein each of said regulating means comprises a pivoted double-armed lever, each double-armed lever engaging at one end thereof one of said movable pulley sections and carrying at the other end thereof one of said cam follower means.

13. A variable transmission comprising, in combination, drive pulley means; driven pulley means, each of said pulley means including a pair of oppositely arranged cone pulley sections, one cone pulley section of each of said pulley means being movable in axial direction relative to the other cone pulley section of the respective pulley means; belt means connecting said drive pulley means with said driven pulley means and running between the cone pulley sections of each of said pairs of pulley sections; torque transmitting output means operatively connected to the movable pulley section of said driven pulley means for urging the same against said belt means and toward the other pulley section of said driven pulley means with a force depending on the load torque transmitted by said torque transmitting output means; regulating means including a cam follower means connected to the movable pulley section of said drive pulley means, a turnable cam engaging said cam follower means, and means urging said cam to turn in one direction for pressing said movable pulley section of said drive pulley means against said belt means and toward the other pulley section of said drive pulley means for producing pressure on said belt means independently of the load; and adjustable stop means for limiting in a selected position turning movement of said cam in said one direction.

14. A variable transmission comprising, in combination, drive pulley means; driven pulley means, each of said pulley means including a pair of oppositely arranged cone pulley sections, one cone pulley section of each of said pulley means being movable in axial direction relative to the other cone pulley section of the respective pulley means; belt means connecting said drive pulley means with said driven pulley means and running between the cone pulley sections of each of said pairs of pulley sections; torque transmitting output means operatively connected to the movable pulley section of said driven pulley means for urging the same against said belt means and toward the other pulley section of said driven pulley means with a force depending on the load torque transmitted by said torque transmitting output means; regulating means including a cam follower means connected to the movable pulley section of said drive pulley means, a turnable cam engaging said cam follower means, and means urging said cam to turn in one direction for pressing said movable pulley section of said drive pulley means against said belt means and toward the other pulley section of said drive pulley means for producing pressure on said belt means independently of the load; adjustable stop means for limiting in a selected position turning movement of said cam in said one direction; a ratchet wheel connected to said cam for turning movement; and a releasable ratchet pawl cooperating with said ratchet wheel.

References Cited in the file of this patent

UNITED STATES PATENTS 2,150,456     Perrine _____ Mar. 14, 1939

FOREIGN PATENTS 117,244     Austria _____ Nov. 15, 1929